United States Patent [19]

Amendola et al.

[11] Patent Number: 4,629,918
[45] Date of Patent: Dec. 16, 1986

[54] SPACER TO PREVENT COIL SHIFT

[75] Inventors: Eugene B. Amendola; Kenneth R. Reynolds, both of Erie, Pa.

[73] Assignee: General Electric Company, Salem, Va.

[21] Appl. No.: 780,502

[22] Filed: Sep. 26, 1985

[51] Int. Cl.⁴ .......................... H02K 3/34; H02K 1/32
[52] U.S. Cl. ...................................... 310/65; 310/208; 310/216; 310/260
[58] Field of Search .................. 310/42, 65, 208, 215, 310/216, 214, 258, 260, 254, 43, 217, 218, 270, 271

[56] References Cited

U.S. PATENT DOCUMENTS

| | | | |
|---|---|---|---|
| 2,844,746 | 7/1958 | Coggeshall | 310/65 |
| 3,097,320 | 7/1963 | Koehly et al. | 310/216 |
| 3,195,084 | 7/1965 | Book | 310/65 |
| 3,882,336 | 5/1975 | Boyd et al. | 310/215 |

Primary Examiner—Patrick R. Salce
Assistant Examiner—D. L. Rebsch
Attorney, Agent, or Firm—Arnold E. Renner

[57] ABSTRACT

A spacer for fixedly positioning a winding with respect to the ends an associated core in an electromagnetic apparatus. The spacers are formed of a relatively stiff sheet material with high electrical insulating characteristics and are of a generally rectangular configuration bent to form a V-shaped spacer. The spacers contact ends of the cores and corresponding inner surfaces of their associated windings to hold them in a predetermined position and to define an insulator creep path. The spacers are described in conjunction with a dynamoelectric machine having a pole spaced from windings through use of the insulating spacers.

20 Claims, 8 Drawing Figures

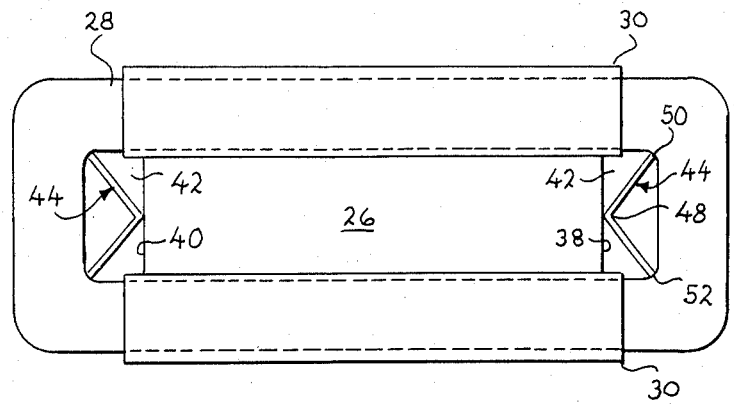 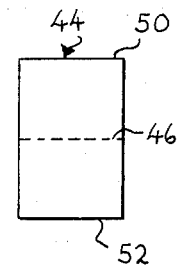
FIG. 2    FIG. 2A
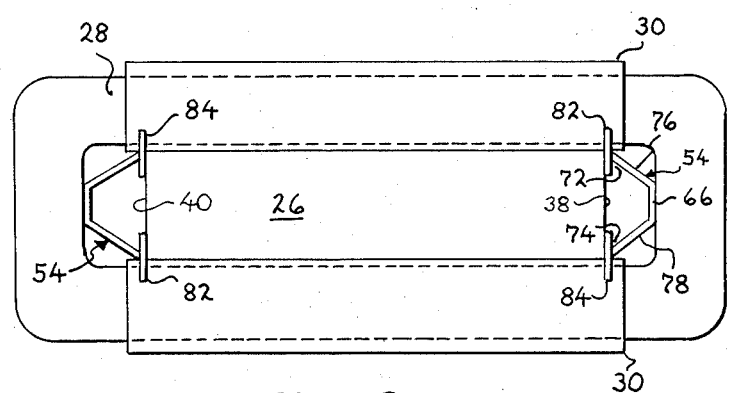 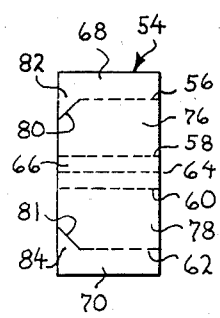
FIG. 3    FIG. 3A
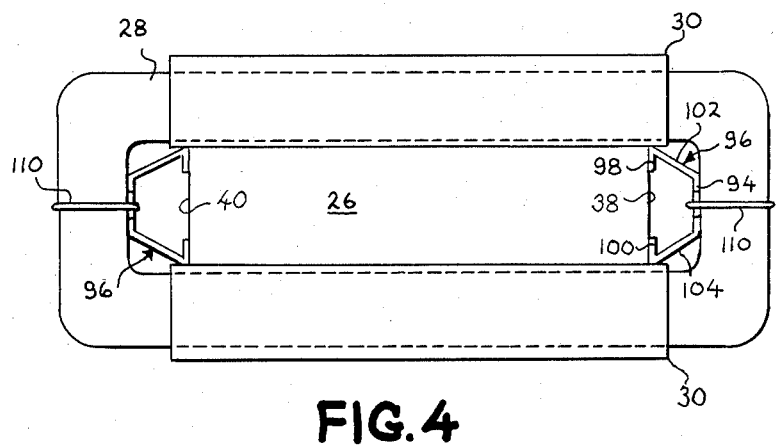 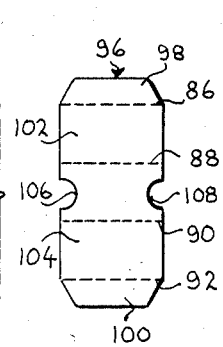
FIG. 4    FIG. 4A

SPACER TO PREVENT COIL SHIFT

BACKGROUND OF THE INVENTION

This invention relates to dynamoelectric machines having magnetic poles, a winding operatively associated with each pole and, more particularly, to apparatus for fixedly positioning each winding with respect to the ends of its associated pole.

DESCRIPTION OF THE PRIOR ART

In dynamoelectric machines, magnetic fields are commonly created by an electromagnet (a "pole") composed of iron cores around which are wound windings of insulated wire. The windings are connected to a power source which forces a current in the windings to produce the magnetic field. Although each individual wire or turn of a winding has a varnish insulation, the voltage between the windings and the iron core is such that it is desirable to provide additional insulation in order to reduce the possibility of failure due to electrical short-circuits between core and winding. Consequently, some form of sheet insulation is normally placed between the windings and cores and the conductive frame structure to which the cores are mounted. In a typical dynamoelectric machine such as, for example, a motor, a core generally is much longer than it is wide, thus forming an extremely elongated rectangle having long sides and narrow ends. At the ends of such cores, normal sheet insulation results in gaps or cracks where the insulation is cut to conform to the core ends. If the winding is wound or formed to conform exactly to the core dimension in both the length and width directions, there will exist a possibility of electrical breakdown through any joint created by folding the sheet insulation. One prior art approach to this problem has been to place additional layers of insulation at the core ends such that the spacing between the winding and core at the ends is extended. While the additional layers of insulation provided the required insulation creep distance, further problems are created with regard to maintaining the insulation in position and with providing resiliency to allow for thermal expansion and contraction of the windings while inhibiting overall shifts in position of the coil with respect to the core.

While many attempts have been made to solve the problem of coil shift adjacent the ends of cores, the present invention is particularly well suited for a technically efficient, low cost solution to this problem.

It is an object of the present invention to provide an improved insulating arrangement for windings of a dynamoelectric machine.

It is another object of the present invention to provide an insulating arrangement which appropriately spaces windings from an associated core while permitting thermal and electrical expansions and contractions of the winding.

SUMMARY OF THE INVENTION

In accordance with the present invention there is provided a spacer for use in a dynamoelectric machine for fixedly positioning a winding with respect to a core and for preventing the shifting of the winding with respect to its associated core ends. The spacer is formed of a relatively stiff sheet material having high electrically insulating characteristics. The sheet material is generally rectangular in configuration and formed in a v-shape with at least three contact points. Each contact point abuts either an end of the core or an adjacent surface of the winding so as to appropriately space the winding from the core and to maintain the winding in a fixed position with respect to the core. The sheet material is preferably NOMEX ® (a trademark of E. I. DuPont de Nemours and Co.) insulating sheet material about thirty mils in thickness. In alternate embodiments of the invention, the sheet material is bent along four parallel bend lines, the two interior bend lines defining therebetween a central flat section adapted to contact and support the winding. The two exterior bend lines define two external flat sections adapted to contact the end of the pole. The two intermediate flat sections between the central flat section and two external flat sections define the fixed, predetermined space between the winding and end of the core. A further embodiment includes angled slits adjacent the exterior bend lines to define triangular lances positionable between the winding and motor frame at each side of the core for preventing the spacer from falling out of the space. Another embodiment includes semi-circular edge notches to facilitate the attachment of the spacer to the winding by tying.

BRIEF DESCRIPTION OF THE DRAWINGS

While the invention is described in particularity in the claims annexed to and forming a part of this specification, a better understanding of the invention can be had by reference to the following description taken in conjunction with the accompanying drawing in which:

FIG. 2A is a plan view of a spacer constructed in accordance with the present invention prior to bending while FIG. 2 is a plan view of one pole of the motor of FIG. 1 showing the spacer in operative position between one end of a core and its associated winding;

FIG. 3A is a plan view of an alternate embodiment of a spacer constructed in accordance with the present invention prior to bending while FIG. 3 is a plan view of one pole of the motor of FIG. 1 showing the spacer of FIG. 3A in operative position between one end of a core and its associated winding;

FIG. 4A is a plan view of an additional alternate embodiment of a spacer constructed in accordance with the present invention prior to bending while FIG. 4 is a plan view of a pole of the motor of FIG. 1 showing the spacer of FIG. 4A in operative position between one end of a core and its associated winding; and, FIG. 5 is a perspective view illustrating the relationship of a pole core, pole coil and the spacer of FIGS. 3 and 3A.

DESCRIPTION OF THE PREFERRED EMBODIMENT

Figure 1:
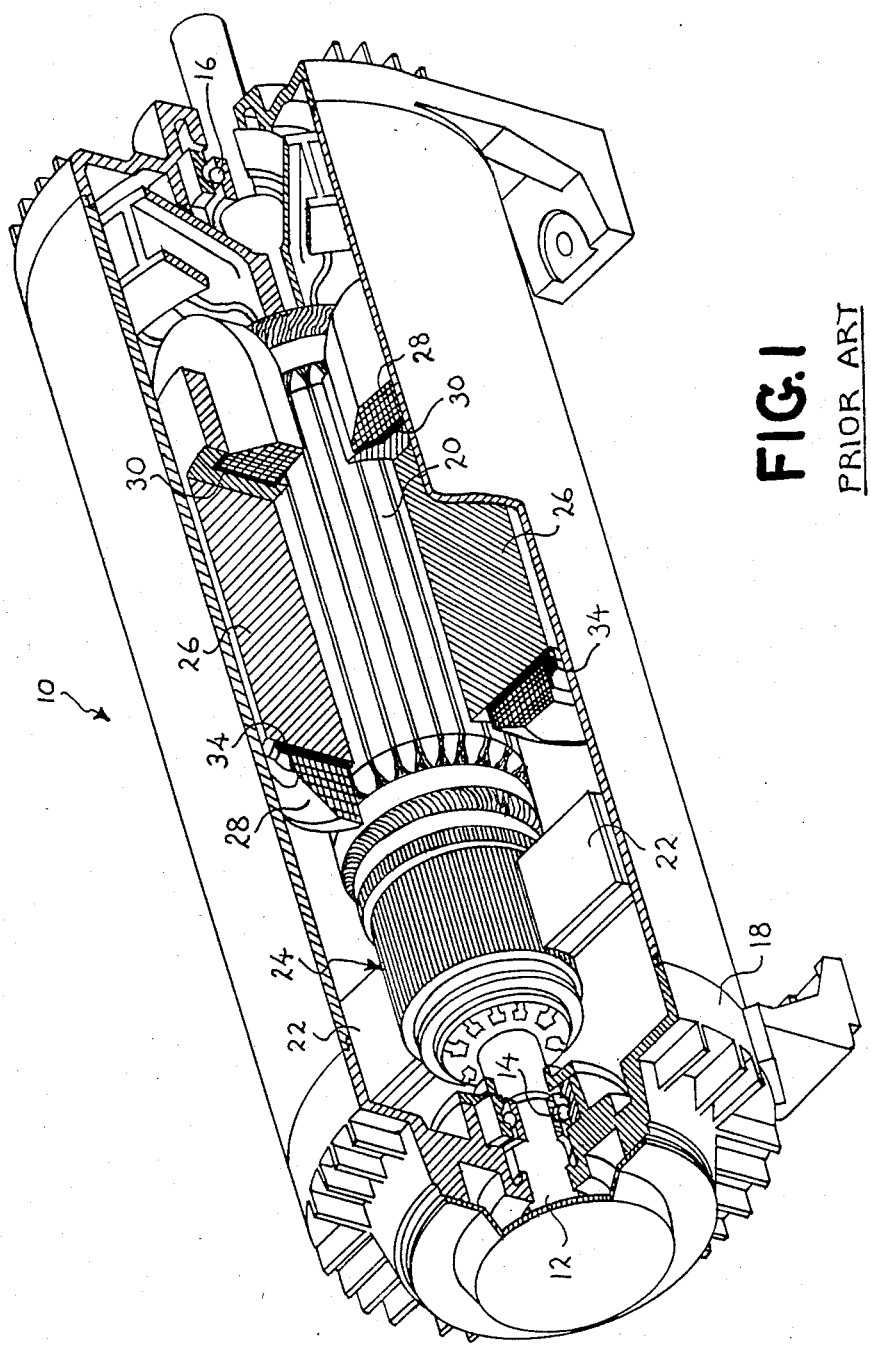
FIG. 1 is a perspective illustration of a dynamoelectric machine, in the form of a direct current (DC) motor, for which the present invention is particularly adapted.

Shown in FIG. 1 is a dynamoelectric machine in which the present invention may be employed. The machine is shown as a direct current (DC) motor 10. The machine includes a rotor shaft 12 mounted on bearing assemblies 14 and 16 at opposite ends of a housing or machine frame 18. A rotor 20 is mounted on and rotates with shaft 12. Electrical power is coupled to windings of rotor 20 by brushes 22 which contact commutator bars 24. The commutator bars 24 are connected to selected ones of the ends of the windings on the rotor 20.

Electrical energization of the rotor windings creates magnetic poles on the rotor 20 which interact with magnetic poles of a fixed stator to effect rotation of shaft 12.

The motor stator comprises a plurality of field poles, each field pole including an iron core such as that indicated at 26 and an electrically energizable winding such as that indicated at 28. Although the windings 28 are formed of insulated wires, such insulation is typically a varnish material which is subject to breakdown and easily damaged. Accordingly, the windings 28 are further insulated from the pole cores 26 by means of sheet insulation such as that illustrated at 30. Along the length of the cores 26 the sheet insulation 30 provides satisfactory insulating characteristics since the sheet insulation can bend sufficiently to conform to the shape of a face of the core 26 and winding 28. However, at the ends of the windings 28, there may exist breaks or joints in the insulation 30 occasioned by bending and cutting the insulation to fit across the ends of cores 26. Such joints or breaks in insulation 30 create a creep path for current leakage which can result in arcing or voltage breakdown between the winding 28 and a core 26. As shown in FIG. 1, one solution to this problem at the end of winding 28 around cores 26 is to insert additional layers of insulation 34 to provide an adequate creep distance to prevent voltage arc-over The windings 28 are generally formed to be longer than the cores 26 over which they fit in order to provide space for an insulated creep path. The windings 28 then must be retained, such as by spacing insulation 34 to prevent the windings from moving with respect to the core and closing up this required creep distance.

Referring to FIG. 2, there is shown a planar top view of one pole of the motor of FIG. 1 having a core 26 and a surrounding winding 28. Positioned lengthwise along the sides of the core 26 (and extending along an inside surface of the motor frame between the winding 28 and the frame) are the pre-formed insulating sheets 30. It should be noted that the ends of the sheets 30 extend beyond ends 38 and 40 of core 26 and into spaces 42 between the core ends and an inner surface of the winding 28. The spaces 42 provide the required insulation creep distance between the core 26 and winding 28. In order to maintain the proper insulation distance, there are provided spacers 44 which not only define the proper distance but also provide resiliency to compensate for thermal distortion of the winding 28.

In a preferred embodiment, the spacers 44 are formed of a stiff sheet material of the same type as is used for insulating sheets 30. One such material to achieve this objective in the preferred embodiment of the invention is NOMEX ®sheet material at about 30 mils (0.030 inches) in thickness. This material is fiberous in nature and will bend to form sharp corners without breaking.

As shown in FIGS. 2 and 2A, the spacers 44 may be formed of a rectangular sheet of NOMEX ® insulating material bent along a central axis to form a v-shape with a bend line 46 forming a bend 48 in contact with an approximate center line of the pole core 26. Ends 50 and 52 of spacers 44 are wedged into contact with the inner surface of the winding 28 to effect the appropriate holding action at the predetermined required voltage insulating distance. Spacers 44 are utilized at each end of the core 26 to effectively preclude the shifting of the winding 28 at both ends of the core.

In an alternate embodiment of the invention as shown in FIGS. 3 and 3A, the sheet material is again cut in a rectangular shape to form a spacer 54 more elongated than in the embodiment of FIG. 2A. According to this embodiment, four bend lines 56, 58, 60 and 62 are provided, each parallel to a short end of the spacer 54. The two interior bend lines 58 and 60 are equally spaced from a parallel centerline 64 of the spacer to define therebetween a central portion 66 which, upon bending, at bends 58 and 60 may be placed in face contact with the winding 28. The bend lines 56 and 62 define end sections 68 and 70 respectively, adapted to be bent facing toward and contacting the ends of the core 26 adjacent the sides of the cores. As can be seen in FIG. 3, the bend lines 56 and 62 form bends 72 and 74, respectively, where they are in contact with a core end. Sections 76 and 78 defined by bend lines 56 and 58 and lines 60 and 62 establish the distance between the winding 28 and the ends of the core 26. The spacer 54 will be seen to have the same basic v-shape as spacer 44 but with a truncated vertex 66.

In the embodiment of FIG. 3A, slits 80 and 81 may be formed along one elongated edge of the spacer 54 angled outwardly and terminating at the exterior fold lines 56 and 62, respectively. When the spacer 54 is bent into its appropriate orientation, these cuts will define lances 82 and 84 which upon folding or bending of the spacer 54 along the bend lines 56 and 62 will protrude such that the lances can be positioned to restrain the spacer 54 to protect against it falling out of the space between the core 26 and winding 28. The lances 82 and 84 rest upon a surface of the winding 28 adjacent the frame of the motor 10 to prevent spacers 54 from falling towards the rotor 20.

Figure 5:
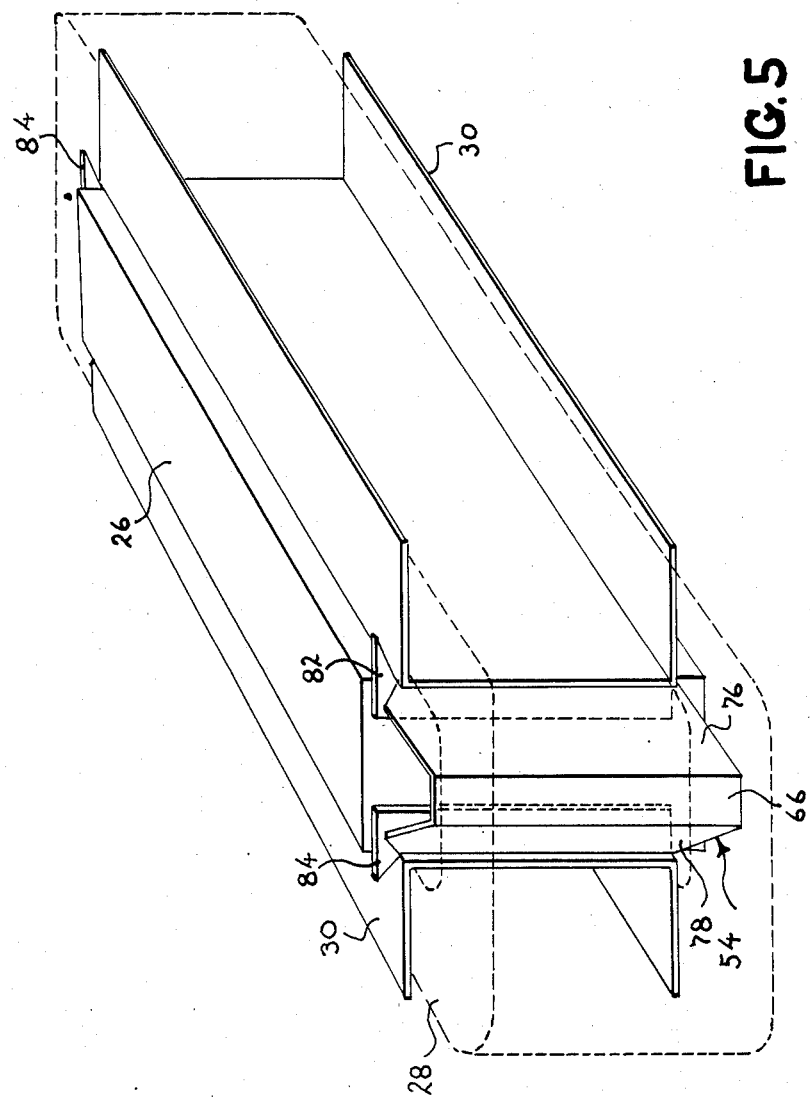

The position of spacer 54 with respect to core 26 and winding 28 is better illustrated in the perspective view of FIG. 5 in which like elements are designated by like reference characters. FIG. 5 also clearly illustrates the location and function of the lances 82 and 84. This FIG. 5 is believed representative of the manner of placement of each of the embodiments of the present invention. In order to clearly illustrate the lances 82 and 84, FIG. 5 is a view looking inward toward the motor rotor such that the upper visible portion of the core 26 is that portion normally adjacent the motor shell or frame.

A third embodiment of the invention is shown in FIGS. 4 and 4A. FIG. 4A illustrates a spacer 96 having four parallel bend lines 86, 88, 90 and 92 similar to the embodiment of FIGS. 3 and 3A, arranged to define a central section 94 of the spacer 96. The bend lines 86 and 92 form external sections 98 and 100 for contacting the ends of the core 26. Intermediate sections 102 and 104 define the distance between the ends of core 26 and winding 28 as shown in FIG. 4. This embodiment has been found particularly well suited for use with cores and windings having wide cross-sections such as, for example, those associated with field poles as opposed to those associated with commutating poles.

Also in this third embodiment of FIGS. 4 and 4A, semicircular edge notches 106 and 108 are provided centrally on the elongated edge of the spacer 96. These notches are to facilitate the securing of the spacer 96 to retain it in place through the use of tie wraps 110 of an insulating material which wrap around the winding and spacer.

In prior art approaches to motor construction, a winding is prepared exterior of a motor, wrapped in an insulating material and positioned about a pole core, which core is then mounted in a motor frame. In other motors, it is advantageous to create a winding by wrapping wires around a core in the motor thus facilitating the desirability of insulating material to ensure that the wires of the winding maintain their proper orientation and are electrically insulated from the motor frame. When the wires are wound within the motor around the core, it is not possible to wrap the finished winding and consequently the sheet insulating material 30 adjacent the winding wires facing the frame and poles in addition to the spacers of the present invention is desirable.

Various modifications may be made within the concepts of the present invention. For example, certain embodiments of the spacer were illustrated in associated with certain types of motor cores and windings. It should be understood that the various embodiments of the spacer could readily be utilized with yet other forms of electromagnetic devices in which an electrical winding is positioned around a core and it is desireable to prevent shifting of the winding with respect to the core. Such applications include, by way of example, AC and DC motors or generators and solenoids. All such embodiments, however, have utility for their common intended function of spacing a winding from a core. All such embodiments are wedged into operative position between a winding and a core so as to flex and maintain the appropriate preferred spacing even when the windings may expand or contract during operation. All of the embodiments further provide for an insulated creep path between the winding and its associated core.

Although the present invention has been described in terms of three basic embodiments, it will be appreciated that the invention is not limited to the precise embodiments disclosed or discussed herein since other embodiments will be readily apparent to those skilled in the art. Accordingly, it is intended that the invention be interpreted in correspondence with the scope and spirit of the appended claims.

What is claimed is:

1. Apparatus for positioning a winding with respect to a core for preventing shifting of the winding with respect to the core, said apparatus comprising a spacer formed of a relatively stiff sheet material having electrical insulating characteristics, said spacer being generally rectangular in configuration with at least one bend line, said spacer being bent along said bend line to form a V-shape having first and second legs and a vertex defined by said bend line, whereby said spacer is positionable between the core and the winding such that each leg of the V-shape spacer operates against said vertex to define a predetermined distance between the core and the winding.

2. The apparatus as set forth in claim 1 wherein the sheet material is NOMEX ®insulating sheet material.

3. The apparatus as set forth in claim 2 wherein the sheet material is about thirty mils in thickness.

4. The apparatus of claim 1 wherein said spacer is inserted between the core and the winding such that said vertex contacts the core, each end of the legs of the spacer being in contact with a corresponding surface of the winding to thereby position the winding with respect to the core.

5. The apparatus as set forth in claim 1 wherein said spacer includes two parallel bend lines approximately centered with respect to the ends of said spacer whereby bending of said spacer along said bend lines is effective to define said substantially v-shaped spacer having a truncated vertex.

6. The apparatus as set forth in claim 5 wherein said spacer includes two further bend lines parallel to said two centered bend lines, each of said further bend lines being located within a predetermined distance of a corresponding one of the ends of said spacer whereby that section of said spacer defined by the two bend lines on each side of the center of said spacer establishes said predetermined space between core and winding.

7. The apparatus of claim 6 wherein said two further bend lines each define a section of said spacer which is bent inwardly in said V-shape to establish a base portion for each leg.

8. The apparatus as set forth in claim 1 wherein said spacer includes four parallel bend lines, the two interior bend lines defining therebetween a central flat section adapted to contact and support the winding, the two exterior bend lines defining therebeyond two external flat sections adapted to contact a surface of a core, and the two intermediate flat sections between the central flat section and two external flat sections defining the predetermined space between the winding and the core.

9. The apparatus as set forth in claim 6 and further including angled slits adjacent the exterior bend lines to define triangular lances positionable to rest upon a surface of the winding whereby said spacer is prevented from falling out of the space between the winding and the core.

10. The apparatus as set forth in claim 8 and further including angled slits adjacent the exterior bend lines to define triangular lances positionable to rest upon a surface of the winding whereby said spacer is prevented from falling out of the space between the winding and the core.

11. The spacer as set forth in claims 6 and further including semi-circular notches to facilitate the attaching of said spacer to the winding by use of a tie wrap encircling said spacer and winding and engaging said notches.

12. The spacer as set forth in claim 8 and further including semi-circular notches to facilitate the attaching of said spacer to the winding by use of a tie wrap encircling said spacer and winding and engaging said notches.

13. In a dynamoelectric machine, having at least two poles, each pole comprising a magnetic core and a winding positioned thereon, a pair of spacers for positioning each said winding with respect to each end of each said core, said spacers each being formed of a relatively stiff sheet material with electrically insulating characteristics, each said spacer being formed in substantially a V-shape configuration to define a three vertex spacer, each said spacer being inserted between said winding and an end of said core whereby each of said vertices is in contact with a corresponding adjacent surface of said winding and said core to hold said winding in a fixed position spaced from an end of said core a distance sufficient to define an insulated creep path.

14. The apparatus as set forth in claim 13 wherein each said spacer includes four parallel bends, the two interior bends defining therebetween a central flat section, the two exterior bends defining therebeyond two external flat sections, and the two intermediate flat sections between the central flat section and two external flat sections defining the fixed, predetermined space between said winding and the ends of said core.

15. The apparatus as set forth in claim 14 wherein each said spacer is inserted between said winding and said core such that said central flat section contacts said winding and said external flat sections contact said core.

16. The apparatus as set forth in claim 15 wherein said central flat section of each said spacer constitutes the major extent thereof.

17. The apparatus as set forth in claim 13 wherein the bend in each said spacer is located at the center of said spacer and is positioned in contact with an end of its associated core and with the ends of said spacer in contact with its associated winding.

18. In a dc motor having main and commutator poles each having a core and a winding operatively associated with each said core and a pair of spacers for positioning each winding with respect to the ends of its associated core, said spacers each being formed of a relatively stiff sheet material with high electrically insulating characteristics, each said spacer for each said commutator pole being generally rectangular in configuration with at least one bend and with said bend being located adjacent to an end of its associated commutator core and with the distal ends of each said spacer being located in contact with its associated winding to hold its associated winding in a fixed position spaced from an end of said commutator pole core a distance sufficient to define an insulated creep path, and each said spacer for each said main pole including four parallel bends, the two interior bends defining therebetween a central flat section constituting a central portion of each retainer contacting and supporting its associated winding, with the two exterior bends defining therebeyond two external flat sections contacting the ends of its associated main pole core, and the two intermediate flat sections between the central flat section and two external flat sections defining the fixed, predetermined distance between the ends of said main pole core and its associated winding sufficient to define an insulated creep path.

19. The apparatus as set forth in claim 18 wherein each spacer for each commutator pole includes four parallel bends, the two interior bends defining therebetween a central flat section constituting a central portion of each retainer contacting and supporting its associated winding, the two exterior bends defining therebeyond two external flat sections contacting the ends of its associated commutator pole core, and the two intermediate flat sections between the central flat section and two external flat sections defining the fixed, predetermined distance between the ends of said commutator pole core and its associated winding sufficient to define an insulated creep path.

20. The apparatus as set forth in claim 18 wherein each spacer for each commutator pole includes a bend located in the center of said spacer in contact with an end of its associated commutator pole core and with the ends of each spacer contacting its associated winding.

* * * * *